United States Patent [19]
Enters et al.

[11] 3,708,968
[45] Jan. 9, 1973

[54] COMBINED LAWN MOWER, LAWN VACUUM AND DEBRIS COLLECTOR

[75] Inventors: Edward W. Enters, Fredonia; Edgar W. Detjen, Kiel; Robert M. Rubin, Sheboygan, all of Wis.

[73] Assignee: Gilson Bros. Co., Plymouth, Wis.

[22] Filed: Nov. 1, 1971

[21] Appl. No.: 194,197

[52] U.S. Cl. .................. 56/16.5, 56/194, 56/202, 56/320.2
[51] Int. Cl. .................................................. A01d 35/22
[58] Field of Search ................ 56/12.8–13.4, 16.5, 56/16.6, 194, 201, 202, 255, 295, 320.2

[56] References Cited

UNITED STATES PATENTS

| | | |
|---|---|---|
| 3,367,091 | 2/1968 | Weiland .............................. 56/13.4 |
| 3,006,128 | 10/1961 | Weiland .............................. 56/194 |
| 2,807,126 | 9/1957 | Bennett ............................... 56/13.4 |

*Primary Examiner*—Louis G. Mancene
*Assistant Examiner*—J. A. Oliff
*Attorney*—Wheeler, House & Wheeler

[57] ABSTRACT

A combined lawn mower, lawn vacuum and debris collector includes a housing for a rotary lawn mower blade, a discharge chute for air entrained debris leading from the lower housing to a separator which separates debris from the air, a collector for receipt of separated debris and a return chute for separated air, said return chute having an outlet in said housing for recirculating said separated air back to the mower housing.

6 Claims, 6 Drawing Figures

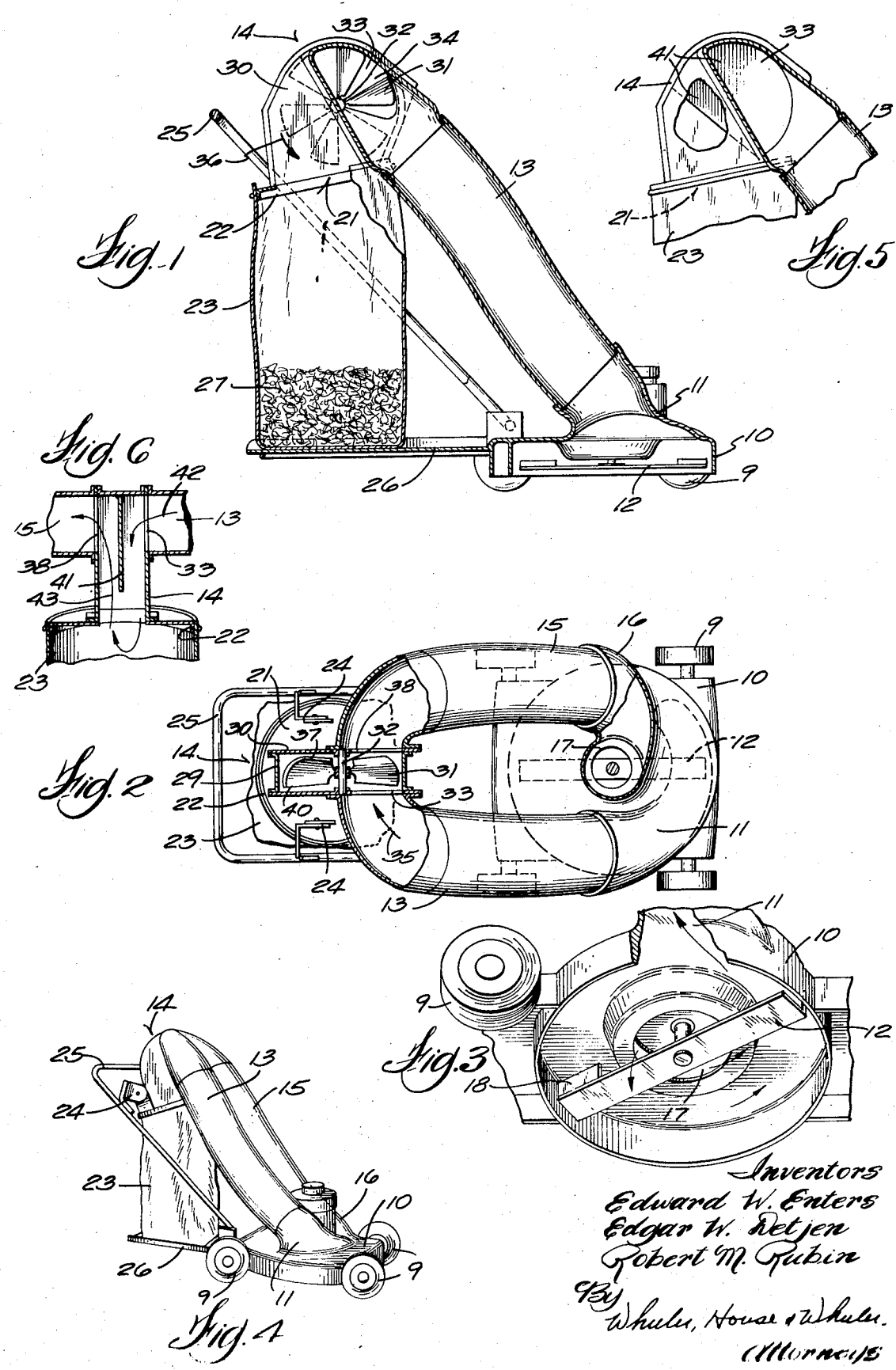

COMBINED LAWN MOWER, LAWN VACUUM AND DEBRIS COLLECTOR

BACKGROUND OF THE INVENTION

Heretofore lawn vacuums have typically discharged air and entrained debris into a porous bag, the air being discharged through the bag pores and the debris being trapped therein. The debris is then usually periodically transferred from the porous bag to a plastic or like air impervious bag for disposal. This sequence requires transfer of the debris from one bag to another.

SUMMARY OF THE INVENTION

In accordance with the present invention, it is unnecessary to transfer debris from one bag to the other, as the debris is originally collected in a disposable plastic or air impervious bag. As soon as the bag is full, it is placed at the curb for pickup, or is otherwise disposed of, without requiring any further handling or transfer of the debris.

Instead of discharging air through the pores of a porous debris collector bag, the present invention relies upon a separator for separating the debris from the air, only the debris being trapped in the bag. Air separated from the debris is returned to the mower housing for recirculation and entrainment of succeeding increments of debris.

The separator may take various forms. A free-wheeling fan type separator and a simple deflector baffle are illustrated herein by way of exemplification.

Other objects, features and advantages of the invention will appear from the disclosure.

DESCRIPTION OF THE DRAWINGS

FIG. 1 is a vertical cross section taken through apparatus embodying the invention.

FIG. 2 is a top view, partly in horizontal cross section through the apparatus of FIG. 1.

FIG. 3 is a fragmentary bottom perspective view of the mower housing.

FIG. 4 is a reduced scale perspective view of apparatus embodying the invention.

FIG. 5 is a fragmentary vertical cross section taken through a modified embodiment of the invention.

FIG. 6 is a fragmentary transverse cross section taken through the embodiment of FIG. 5.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The apparatus of the present invention is movably supported upon a rotary blade mower housing 10 having wheels 9 and which is conventional in many details, but which is unique in others. Housing 10 is provided with an involute discharge spout 11 leading from the periphery of housing 10 and above the level of rotation of the rotary mower blade 12. The outlet of spout 11 connects to a discharge chute 13 which leads to the intake port 33 of a separator 14. At its outlet port 38 separator 14 is provided with a return chute 15, the discharge end of which is connected to a spout 16 having an outlet port 17 at the central eye of the housing 10. Accordingly, air picked up by the blade 12 and impelled by its vanes 18 through chute 13 is ultimately returned by chute 15 and back into housing 10 through the eye 17, whereupon the air is again picked up by the blades 12 and recirculated in a substantially closed circulating system.

The separating chamber 14 is mounted on top of a hanger bracket 21 which has a suspension ring 22 to which the mouth of air impervious plastic bag 23 is releasably attached. Hanger bracket 21 is supported on brackets 24 connected to machine handle 25.

Rearwardly projecting from the mower housing 10 is a platform 26 on which the bottom of the bag 23 rests, thus to support the weight of the debris 27 which accumulates therein.

The debris 27 comprises grass clippings, leaves, litter, twigs, etc., all of which is entrained in the air flow generated by the whirling blade 12.

The separator 14 may take various forms. Its important function in the present invention is to separate the debris from the air, discharge the debris into the collector bag 23 and to bypass the air into the return chute 15 from whence it returns to the mower housing 10. In the embodiment shown in FIGS. 1 and 2, separator 14 comprising a housing having spaced parallel side walls 30 and a wrap wall 29 within which a multi-bladed free-wheeling fan rotor 31 turns on axle 32. At one side of the axle the walls 30 are provided with ports 33, 38 which are laterally aligned and to which the adjacent ends of the chutes 13, 15 connect.

The fan blades 31 have substantial spacing 34 therebetween so that air exiting from the discharge chute 13 in the direction of arrow 35 in FIG. 2 may pass directly through the rotor spaces 34 and into the return chute 15. Such air flow, however, causes rotation of the fan 31, which free-wheels on its axle 32 in the direction of arrow 36 in FIG. 1.

Each blade desirably has a rearwardly curved portion 37 which functions under the reaction pressure of the air to rotate the blade in the direction of arrow 36. Each blade also has a transversely curved portion 40 which functions as a paddle to intercept and throw debris in the direction of arrow 36 and into the collector bag 23.

The debris typically will have mass, momentum and inertia considerably in excess of the air, so that momentum imparted to the debris by the thrower paddles 40 will impel these heavier debris particles into the bag 23. The relatively light weight air will pass right through the spaces 34 between the blades 31 and into the return chute 15. The speed of free-wheeling rotation of the rotor 31 is such that substantially all of the debris is intercepted by the free-wheeling blades and is thrown into the collector bag 23.

Accordingly, the internal air pressure to which the bag is subject is kept to a minimum, as the air is recirculated, instead of being forced through the bag.

A modified separator embodiment is illustrated in FIGS. 5 and 6 in which the housing 14 has its inlet and outlet ports 33, 38 aligned transversely as the preceding embodiment. In lieu of the rotor 31, this separator embodiment is provided with a deflector baffle 41 which intervenes midway between the ports 33, 38. Air and debris flowing through chute 13 will travel on the path of arrow 42 and be deflected downwardly into the collector bag 23. The heavier debris will continue on and be trapped. However, the light weight air will rebound, recirculate and return on the path of arrow 43 through outlet port 38, into the return chute 15 and back to the eye 17 of the mower blade housing 10.

In both embodiments of the invention, a separator separates the debris from the air and collects the debris while returning the air in a substantially closed circuit system to the mower housing where the air is again picked up by the mower blade 12 and returned with a fresh charge of debris through chute 13 to the separator 14.

We claim:

1. A combined lawn mower, lawn vacuum and debris collector comprising a housing for a rotary lawn mower blade, a discharge chute for air and debris impelled by the blade leading from the mower housing to a separator for separating debris from the air, a disposable collector bag releasably attached to the separator for initial collection of separated debris in said disposable collector bag and a return chute from said separator to a return chute outlet in said housing for returning separated air from the separator to the housing and recirculating said air back to the separator.

2. The invention of claim 1 in which the discharge chute leads from the periphery of the mower housing, said return chute outlet being disposed at the eye of said mower housing.

3. The invention of claim 1 in which said disposable collector bag is substantially air impervious.

4. The invention of claim 1 in which said separator comprises a rotor having spaced blades between which air is transferred from the discharge chute to the return chute, said blades having debris impelling paddles for throwing debris into said disposable collector bag.

5. The invention of claim 4 in which said separator comprises a rotor housing having an axle on which the rotor turns, said housing having ports for the adjacent ends of said chutes aligned at opposite sides of said housing and at one side of said axle whereby said blades sweep across the space between said ports to intercept debris fed to said separator.

6. The invention of claim 1 in which said separator comprises a housing having ports for the adjacent ends of said chutes aligned at opposite sides of said housing, and a baffle intermediate said ports for deflecting both air and debris from said discharge chute into said disposable collector bag and returning air into said return chute.

* * * * *